United States Patent [19]
Piasek et al.

[11] 3,718,663
[45] Feb. 27, 1973

[54] PREPARATION OF OIL-SOLUBLE BORON DERIVATIVES OF AN ALKYLENE POLYAMINE-UREA OR THIOUREA-SUCCINIC ANHYDRIDE ADDITION PRODUCT

[75] Inventors: Edmund J. Piasek, Chicago; Robert E. Karll, Batavia; Richard J. Lee, Downers Grove, all of Ill.

[73] Assignee: Standard Oil Company, Chicago, Ill.

[22] Filed: Aug. 31, 1970

[21] Appl. No.: 68,470

Related U.S. Application Data

[62] Division of Ser. No. 685,254, Nov. 24, 1967.

[52] U.S. Cl............260/326.3, 252/49.6, 260/326 N, 260/326.5 F, 260/462 R, 260/552 R, 260/553 A
[51] Int. Cl..............................................C07d 27/00
[58] Field of Search......260/551 B, 570.5 PA, 462 R, 260/551 B, 326.3, 326.5 F

[56] References Cited

UNITED STATES PATENTS 3,539,633   11/1970   Piasek et al...................260/462 R X
3,036,003   5/1962   Verdol................................252/33.4
3,087,936   4/1963   Lesuer..............................260/326.3

Primary Examiner—Howard T. Mars
Assistant Examiner—Leo B. DeCrescente
Attorney—Arthur G. Gilkes, William T. McClain and Fred R. Ahlers

[57] ABSTRACT

Complex substituted alkylene polyamines such as di(alkenyl-succinimide) of $N_1,N_3$ symmetrical bis(aminopolyazalkylene) ureas that react with boric acid in oil solution either with low boric acid utilization efficiency or react to form a hazy product whose haze cannot be removed by filtration are readily converted to the desired oil solution of boron and nitrogen containing products by first preparing an oil solution of super boron containing product of the complex substituted alkylene polyamine, combining the oil solution of super boron containing product with oil solution of the complex substituted alkylene polyamine and equilibrating the resulting mixture to a uniform boron to nitrogen content throughout.

4 Claims, No Drawings

PREPARATION OF OIL-SOLUBLE BORON DERIVATIVES OF AN ALKYLENE POLYAMINE-UREA OR THIOUREA-SUCCINIC ANHYDRIDE ADDITION PRODUCT

RELATED APPLICATION

This application is a division of application Ser. No. 685,254, filed Nov. 24, 1967.

BACKGROUND OF THE INVENTION

Borated derivatives of acylated nitrogen-containing compounds such as amines, polyamines and hydroxy amines have been described as useful detergent-dispersant compounds, for example in U.S. Pat. No. 2,216,618, No. 3,000,916 and No. 3,087,936. Boric acid is one of the reactants found most useful for the preparation of those borated acylated nitrogen-containing compounds. Boric acid can react with a hydrogen attached to a nitrogen of an amine or with the hydroxyl group of a hydroxy amine and in both cases water is a by-product. Such reactions of boric acid are not simple but rather are complex. For example, more than one mole of boric acid can react with each equivalent of secondary amino group

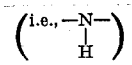

in the acylated nitrogen-containing compounds. This reaction between boric acid and the types of acylated nitrogen-containing compounds disclosed in U.S. Pat. No. 2,216,618, No. 3,000,916 and No. 3,087,936 is rather straightforward. The acylated nitrogen-containing compound and the amount of boric acid to give the desired boron to nitrogen ratio (ratio of gram atom of boron to gram atom of nitrogen) are combined and the mixture heated to drive off by-product water. Solid boric acid suspensions of boric acid in alcohols such as methanol or in hydrocarbons and aqueous solutions of boric acid can be added to the acylated nitrogen-containing compounds or solutions thereof. Removal of alcohol and solvent water and/or by-product water (water of reaction) is accomplished by heating the mixture of boric acid and acylated nitrogen-containing reactants at atmospheric pressure or reduced pressure (subatmospheric pressure) with or without a gas sweep or purge. The means selected to remove by-product water is a matter of choice and is generally selected on the basis of efficiency of by-product water removal in the shortest time. The reactants should be combined under conditions that do not favor the formation of unreactive species of boric acid by its dehydration. Thus when the acylated nitrogen-containing reactant is at a temperature at or above the normal boiling point of water it is convenient to prevent such a dehydration to add water with boric acid. This amount of water need not be sufficient to dissolve the boric acid for a lesser amount of water is suitable for this purpose. Usually when the reactants are combined at temperatures below 100° C. there is no need to add water. However a small amount of water or alcohol, especially methanol, has a promoting effect on the reaction between boric acid and the acylated nitrogen-containing compound.

Insofar as can be ascertained from the three patents mentioned before the utilization of boric acid is efficient. In other words, the ratio of gram atoms of boron to nitrogen in the reactants boric acid and acylated nitrogen-containing compound used is generally the same as the ratio of gram atoms of boron to nitrogen in the borated product. The same efficient boric acid utilization has been experienced when preparing borated acylated nitrogen-containing compounds from boric acid and the acylated nitrogen-containing compounds of the types disclosed and described in the three patents mentioned before. However, when we have tried to borate with boric acid certain acylated nitrogen-containing compounds that are more complex then the acylated nitrogen-containing compounds described and disclosed in those three patents, we have not been able to achieve a high efficiency of boric acid utilization. In some cases the unreacted boric acid can be removed by filtration aided by finely divided filter aid but in other cases a hazy product forms that cannot be clarified by any filtration process. These problems persist even when normal amounts of boration promoters are used. But the haze problem can be overcome by the use of large excesses of water of the magnitude needed to dissolve the boric acid. Such amounts of water may be satisfactory laboratory or other small scale practices but are not satisfactory for commercial practices. In those cases where unreacted boric acid can be removed with the use of a filter aid, the desired gram atomic boron to nitrogen ratio (B/N) can be achieved by the use of gross excesses of boric acid but this practice represents a loss of reactant because the unreacted boric acid is so mixed with filter aid as not only to make recovery of that boric acid commercially unattractive but to result in plugging of the filter and make filtration commercially unattractive.

The more complex acylated nitrogen-containing compounds with which we have experienced difficulty in borating with boric acid have in their molecular structure a carbonyl group linking two aminoazalkylene groups whose terminal amino groups have been acylated. We have, however, found an efficient technique for borating such more complex nitrogen-containing compounds to the desired boron content by an indirect route that provides high boric acid utilization, up to 95 to 98 percent. This technique and a more precise characterization of the more complex nitrogen-containing reactant will be described and defined in the following sections.

SUMMARY OF THE INVENTION

We have found it difficult to borate with boric acid in the usual manner oil-soluble substituted alpha, omega-aminopolyazalkylenes such as a substituted bis(alpha, omega-aminopolyazalkylene) urea or thiourea having as terminal nitrogen-containing groups an alkenyl-succinimido group substituent or a group with a phenolic hydroxyl as in a 2-hydroxy-benzyl or a 2-hydroxy-1,3-xylylene type group. We have found an advantageous technique for borating with boric acid the above class of oil-soluble substituted bis-(alpha, omega-aminopolyazalkylene) urea nitrogen-containing compounds to a uniform boron content in the final product. This technique comprises superborating those nitrogen-containing compounds with boric acid, then mixing the superborated product with unborated nitrogen-containing compound and equilibrating the resulting mixture to a uniform boron to nitrogen content throughout. We have also discovered that the superboration can be readily conducted without the aforementioned haze problem or non-reaction of boric acid.

The equilibration can be accomplished by storing the mixture of superborated and unborated nitrogen-containing compounds at ambient temperature. Usually storage for about 24 to 48 hours at ambient temperature is suitable. The equilibration time can be reduced by heat. The equilibration occurs in less than 1 hour at a temperature of 200° to 250° F. and in one to 4 hours at temperatures of 120° to 200° F. The product after equilibration is no longer a mixture of superborated and unborated nitrogen-containing compound but rather is a single species of borated compound with uniform boron content throughout. It appears that there is an exchange of boric acid moiety from the superborated species to the unborated species so that the product after equilibration is really a new borated species with a uniform but lower boron content throughout.

The oil-soluble nitrogen-containing compounds normally difficult to borate with boric acid are exceptionally useful dispersant-detergent addition agents for lubricating oils. The borated products are more useful as dispersant-detergent addition agents for certain lubricating oil compositions than are the unborated precursors because the borated products have been found to be more compatible with anti-rust, anti-corrosion, anti-wear and anti-oxidant addition agents. For lubricant oil compositions requiring metal salt anti-wear, corrosion, wear and oxidant agents and highly efficient dispersant-detergent agents for successful lubricating life under severe service conditions such as encountered in suburban type stop and go short travel as well as occasional high speed, long distance highway travel, the use of the borated dispersant-detergent addition agent permits the use of less of those metal salt type addition agents. The unborated nitrogen-containing addition agents of the difficulty borated type appear to complex with some of those metal salt type addition agents and prevent them from performing their primary function. Without boration of those difficulty borated type nitrogen-containing oil-soluble dispersant-detergent addition agents there must be used with them large amounts of the metal salt addition agents to achieve their desired primary function so that complexing of some of them by the nitrogen-containing difficulty borated dispersant-detergent addition agents will not leave the lubricating oil composition deficient in the primary function of the metal salt addition agents.

Returning now to the technique of borating with boric acid the normally difficultly borated oil-soluble nitrogen-containing lubricating oil addition agents, we shall define what we mean by "superborated." Those difficulty borated nitrogen-containing addition agents all contain moieties of alpha, omega aminopolyazalkylenes with which boric acid can react in ratios up to about 10 gram moles boric acid per gram atom nitrogen. The difficulty in boric acid boration arises in reacting ratios of less than about 1 gram mole boric acid per gram atom nitrogen. The ease in boration with boric acid appears to increase as one goes upward from the use of ratios from about 1 gram mole boric acid per gram atom nitrogen. Although a ratio of about 10 gram moles boric acid per gram atom nitrogen can be used the problems of handling such large amounts of boric acid, the longer reaction time to react all of the boric acid and the difficulty in processing the resulting high boron product offset the advantages of using such high ratios of boric acid. Ease of processing and advantages of superborating are desirably achieved with ratios of 1 to about 8 gram moles boric acid and preferably achieved with 3 to 6 gram moles boric acid per gram atom nitrogen. Preference has arisen for the use of the borated products as lubricant oil addition agents that have a weight ratio of boron to nitrogen in the range of 0.2 to 0.3 because those borated products not only retain substantially all of the dispersancy-detergency of the unborated precursor but also maximize the desired compatibility with metal salt lubricating oil addition agents. That boron to nitrogen weight ratio range represents a gram atom ratio of boron per gram atom nitrogen in the range of about 0.26 to 0.39. To obtain those gram atom ratios of boron to nitrogen from a superborated product having a gram atom ratio of 1.0 boron per gram atom nitrogen by the equilibration step, there would be combined and equilibrated about three moles of the same nitrogen content unborated species with 1 mole of the superborated product and about 3 moles of the same nitrogen content unborated species with two moles superborated product, respectively. As the gram atom ratio of boron to nitrogen is increased in the superborated product, advantageously the greater becomes the amount of the unborated species that can be equilibrated with the superborated product. Also as the gram atom ratio of boron to nitrogen increases in the superborated product, the amount of final equilibrated product with a gram atom ratio of boron to nitrogen in the range of about 0.26 to 0.39 increases. Thus for a particular total commercial capacity of final product of gram atom ratio of boron to nitrogen in the range of about 0.26 to 0.39 as the boron to nitrogen ratio in the superborated product increases above 1:1 the number of superboration preparations decreases.

For a better understanding of this invention the nitrogen-containing dispersant-detergent addition agents difficultly borated will be described. The difficultly borated nitrogen-containing detergent-dispersant addition agents compounds are advantageously prepared as solutes in a light mineral oil solvent of lubricating quality. For example, light white oils to solvent extracted or solvent extracted and hydrogenated lubricating oil base stocks such as SAE 5W to SAE 10 type oils are useful solvent. Those solutions of difficulty borated nitrogen-containing dispersant-detergent addition agent compounds are prepared as concentrates having 30 to 50 weight percent, preferably 40 to 45 weight percent, of the solute. As before described the complex difficultly borated nitrogen-containing dispersant-detergent addition agents are of two types. The first type contain a carbonyl or thio-carbonyl group joining two moieties of a mono(alkenyl substituted succinimide) of an alpha, omega-aminopolyazalkylene compound wherein the alkenyl substituent on the succinimide group has 30 or more carbon atoms. These nitrogen-containing dispersant-detergents are conveniently prepared by the condensation of urea or thiourea with an alpha, omega-aminopolyazalkylene compound (alkylene polyamine) having the formula:

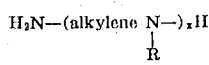

wherein alkylene is a divalent saturated hydrocarbon group of one to eight carbon atoms, R is hydrogen or a lower alkyl hydrocarbon group having one to four carbon atoms and $x$ is an integer of from 2 to about 10. Illustrative of the alpha, omega-aminopolyazalkylene compounds are mono-, di-, tri-, tetra-, penta-, hexa-, hepta-, octa-, nona- and deca- ethylene or propylene di-, tri-, tetr-, pent-, hex-, hept-, oct-, non-, dec- and undec-amines, etc. and their higher alkylene homologs.

The urea or thiourea condensations with alpha, omega-amino-polyazalkylene compounds are carried out in the presence of a light oil solvent by reacting with each mole of urea or thiourea two moles of alpha, omega-polyazalkylene compound under conditions liberating and driving off two moles of ammonia. Then the resulting light oil solution of the condensation product is combined with a light oil solution of the alkenyl substituted succinic anhydride in an amount to provide 2 moles of alkenyl substituted succinic anhydride per mole of condensation product. The condensation product can have the formula when R is hydrogen or lower alkyl:

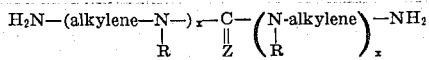

or the formula when R is hydrogen:

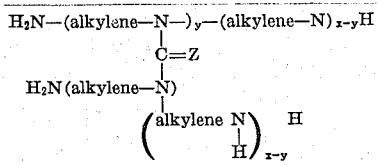

wherein alkylene, R and $x$ all are as before defined and $y$ is $x/2$ or $(x+1)/2$ and Z is oxygen or sulfur. In the alkenylsuccinimide final product the nitrogen of each of the alkenylsuccimido groups is one of the nitrogens of a terminal primary amino group. These final products include compounds having the structure:

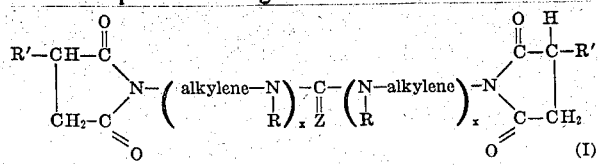

wherein R' is an alkenyl hydrocarbon group having 30 or more even up to 20,000 carbon atoms, preferably derived from polypropylene or a polybutene such as polyisobutylene. The alkenyl substituted succinic anhydride reactant and its preparation from maleic anhydride are known from the prior art.

The second class of complex difficultly borated nitrogen containing dispersant-detergent addition agents are also derivatives of bis-(alpha, omega-aminopolyazalkylene) urea or thiourea compounds but are derived from a multistep preparation also using alkyl phenols, mainly p-alkylphenols, and a source of formaldehyde. The alkyl phenol preferably contain 30 to 20,000 carbon atoms in the alkyl group. This second class of complex nitrogen-containing dispersant-detergent addition agents are also prepared as solutes in light mineral oil solvents of the type previously defined. In the first reaction step the reactants are used in equimolecular proportions and the reaction carried out under conditions to remove by-product water. For example, a light oil solution of 1,700 molecular weight alkyl phenol, formaldehyde and bis-(alpha, omega-aminopolyazalkylene) urea or thiourea product of formulae A and/or B in the mole ratio of 1:1:1 are combined at 180°–200° F. with stirring. The heat of reaction is not removed. The stirred reaction mixture is heated to drive off by-product water. Then to each mole of the first step 1:1:1 product there is added either a source of formaldehyde to provide 0.5 mole formaldehyde. This second reaction mixture is stirred and heated to drive off by-product water.

The types of compounds of this second class of complex nitrogen-containing dispersant-detergent addition agents can be illustrated by the following structural formulae:

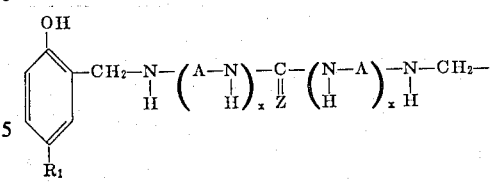

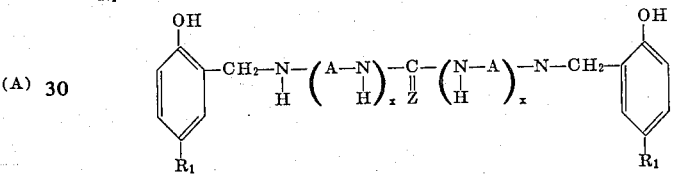

(III)

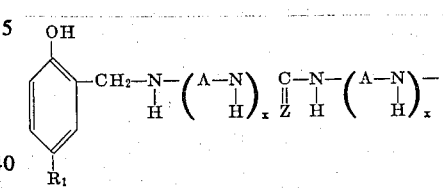

(II)

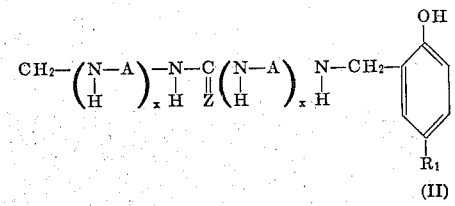

wherein A is the saturated divalent alkylene hydrocarbon group of two to eight carbon atoms, $x$ is 1 to 10, Z is oxygen or sulfur, and $R_1$ is the alkyl hydrocarbon group of from 50 to 300 carbon atoms.

The complex nitrogen-containing difficultly borated compounds illustrated by structural formulae I through III can be named in the following manner keyed to the respective formula number.

Formula I di(alkenylsuccinimide) of $N_1,N_3$ symmetrical bis-(aminopolyazalkylene) urea whose alkenyl group has 30 or more carbon atoms Formula I thiocarbonyl analog di(alkenylsuccinimide) of $N_1,N_3$ symmetrical bis-(aminopolyazalkylene) thiourea whose alkenyl group has 30 or more carbon atoms Formula II N,N'-bis(2-hydroxy-5-alkylbenzylaminopolyazalkylene-carbonylaminopolyazalkylene) diaminomethane Formula II thiocarbonyl analog N,N'-bis(2-hydroxy-5-alkylbenzylaminopolyazalkylene-thiocarbonylaminopolyazalkylene) diaminomethane Formula III N-mono(2-hydroxy-5-alkylbenzyl) substituted 2-hydroxy-5-alkyl-1,3,-di(aminopolyazalkylene-carbonylaminopolyazalkyleneaminomethyl) benzene Formula III thiocarbonyl analog N-mono(2-hydroxy-5-alkylbenzyl) substituted 2-hydroxy-5-alkyl-1,3-di(aminopolyazalkylenethio-carbonylaminopolyazalkyleneaminomethyl) benzene.

Boration with boric acid by the combination of superboration and equilibration of mixtures of compounds having the structural formulae II and III are also within this invention.

Both of the foregoing types of complex nitrogen-containing dispersant-detergent addition agents that preferably are converted to boric acid borated derivatives according to the superboration and equilibration technique of this invention are those derived from tetra-ethylene pentamine or a commercial mixture of ethylene polyamines having the nitrogen content of tetraethylene pentamine or pentaethylene hexamine or a commercial mixture of ethylene polyamines having a nitrogen content of pentaethylene hexamine or mixtures of tetraethylene pentamine and penta-ethylene hexamine or mixtures of those two commercial ethylene polyamines.

The two classes of complex difficulty boric acid borated nitrogen-containing dispersant-detergent addition agents are not part of our invention because the discovery of those two classes of complex products are the inventions of our co-workers.

The following comparative and illustrative examples are presented to assist the understanding and practice of the present invention and to illustrate the problems associated with the boric acid borated derivatives of the two different classes of nitrogen-containing products before defined. For the sake of convenience and to eliminate repetition of descriptive matter that is not a part of this invention, the preparation of two species each of those two different classes of nitrogen-containing products will be first described.

Preparation of Species A of Di(Alkenylsuccinimide) of $N_1,N_3$-Symmetrical Bis(Aminopolyazalkylene) Urea There is first prepared a $N_1, N_3$-symmetrically substituted bis-(aminopolyazalkylene) urea by the condensation reaction of urea and tetraethylene pentamine used in the mole ratios of two moles of tetra-ethylene pentamine for each mole of urea. Into a 2,000 gallon reaction kettle having a jacket for heating and/or cooling the kettle's contents and having a stirrer there are metered 626 gallons (5,400 pounds or 27.5 pound moles) commercial tetraethylene pentamine (a mixture of polyamines having an average of five nitrogens and an average of four ethylene groups per molecule). The polyamine is stirred and heated to 115° F. by steam in the jacket of the kettle. To the stirred polyamine there is added 800 pounds (13.33 pound moles) urea at about 60 pounds per minute. The resulting stirred mixture is heated to 240° F. as rapidly as possible and then heated over 3 to 4 hour period to 300° F. and is held at 300° F. for about three hours. Ammonia evolves from the reaction mixture during heating it from 240° to 300° F. and while it is held at 300° F. To aid the removal of by-product ammonia, inert gas, such as nitrogen, is injected into the liquid reaction mixture. The condensation reaction product has a molecular weight of about 400 and a nitrogen content of about 31 percent by weight. The theoretical product from the condensation of exactly two moles tetraethylene pentamine with one mole of urea would have a molecular weight of 404 and a nitrogen content of about 34.65 weight percent. However, because the commercial tetraethylene pentamine is a mixture of tri-, tetra- and hexa-ethylene tetra-, penta- and hexa-amines whose nitrogen content is the same as that of tetraethylene pentamine and because of incomplete reaction and escape of reactants, the final product has about 31 weight percent nitrogen, an amount slightly below the theoretical amount.

The $N_1,N_3$-symmetrically bis-substituted urea is reacted with polybutenyl substituted succinic anhydride of 960 molecular weight (the polybutenyl substituent is from a liquid viscous polybutene of about 860 molecular weight) to form Species A. This is accomplished by adding to another 2,000 gallon jacketed reaction vessel before described 7,020 pounds of solution containing 3,790 pounds of the 960 molecular weight polymer substituted succinic anhydride dissolved in a mixed solvent consisting of SAE–5W oil and substantially saturated 860 molecular weight branched chain alkane compound of the liquid viscous polybutene. The solution is blanketed with a nitrogen atmosphere, diluted with about 200 gallons of SAE-5W oil, stirred and heated with steam in the kettle's jacket to 250°–260° F. Then to this hot stirred solution there is added in about 30 to 40 minutes 83.8 gallons of the $N_1$, $N_3$-symmetrically bis-substituted urea containing 31 percent nitrogen by weight. The resulting mixture is heated to 300° F. and held at 300° F. for about 2 hours while injecting nitrogen gas into the hot, stirred liquid to assist removal of by-product water. The resulting solution contains Species A as solute and has a nitrogen content of about 2.4 weight percent.

Preparation of Species B of Di(Alkenylsuccinimide) of $N_1,N_3$-Symmetrical Bis(Aminopolyazalkylene) Urea There is first prepared a different $N_1,N_3$-symmetrically bis-substituted urea from urea and a 1:1 volume mixture of tetraethylene pentamine and pentaethylene hexamine. The same procedure and mole ratio of reactants are used as described before for the preparation of the tetraethylene pentamine-urea condensation product reactant for Species A. The resulting tetraethylene pentamine and pentaethylene hexamine-urea condensation product has a nitrogen content of about 32 weight percent.

The mixed $N_1,N_3$-symmetrically bis-substituted urea product of 32 weight percent nitrogen is reacted with the solution of 960 molecular weight polybutenyl substituted succinic anhydride in the same molar ratio of reactants and in the same manner as described for Species A. The resulting solution contains Species B and has a nitrogen content of about 2.4 weight percent.

COMPARATIVE I

Boric Acid Boration of Species A

A portion of the solution of Species A prepared as before described is used for this boric acid boration. The solution has a nitrogen content of about 2.4 weight percent as reported before. This solution is stirred and heated to 260° F. and a slurry of boric acid in SAE-5W oil is added as rapidly as feasible without causing excessive foaming. The amount of boric acid added is about 0.3 gram mole per gram atoms of nitrogen. The resulting mixture is heated to about 300° F. and held at that temperature for about 3 hours while nitrogen gas is injected into the hot stirred liquid for the last 2 hours. Additional SAE-5W oil is added to dilute the borated derivative to about 40 weight percent concentration. This product has a nitrogen content of 2.07 percent and a boron content of 0.58 percent, both by weight. Thus the boron to nitrogen weight ratio is 0.28 to 1.0. The boron utilization (boron charged to boron in the product) is about 0.935 or 93.5 percent. However, the product is hazy. The haze appears to be caused by suspended colloidal material. Filtration of the product using filter aids of various particle sizes does not remove the haze. Water content of the hazy filtered product is negligible so the haze does not result from suspended byproduct water.

COMPARATIVE II

Boric Acid Boration of Species B

Species B is borated with boric acid in the same manner as described in Comparative I for the boric acid boration of Species A. Although the boric acid utilization is high in the boric acid boration of Species B, the unfiltered and filtered products have a haze apparently caused by suspended colloid-like particles.

The following are examples of the superboration and equilibration according to the present invention.

EXAMPLE 1

Superboration and Equilibration of Species A

A solution of Species A, the preparation of which was described before, has a nitrogen content of about 2.4 weight percent. The objective of this illustrative example is to obtain a boric acid borated derivative of Species A having a weight ratio of boron to nitrogen of about 0.26:1. To accomplish this the superboration reaction is conducted in the following manner.

Superboration

To a steam jacket heated reaction kettle having a stirrer there are added 1,730 pounds of solution of Species A, prepared in the same manner as described for the preparation of Species A but omitting the use of SAE-5W oil diluent. This solution of Species A contains about 2.9 weight percent (about 50 pounds) nitrogen. This solution is stirred and heated to 210° F. and at that temperature there is added thereto 383 pounds boric acid to provide 67 pounds boron for a boron to nitrogen charged weight ratio of 1.34:1.0. The boric acid is added as a slurry in 64 gallons of SAE-5W oil. To the stirred mixture there is added 24 gallons of water and the resulting stirred mixture is heated to 280° F. and held at 280° F. while nitrogen gas is injected into the hot liquid until all water, added water and about 1.5 mole of water per mole of boric acid used, is driven off. The resulting solution is filtered while hot. The filtered solution contains 2.08 percent nitrogen, has a boron content of 2.5 percent and a boron to nitrogen weight ratio of about 1.2:1. The boron utilization is about 90 percent.

Equilibration

To the solution of superborated Species A (2,400 pounds) there is added 7,844 pounds of solution of Species A (2.4 percent nitrogen) and the resulting solution is stirred and heated to 250° F. and held at 250° F. for 1 hour. The solution is filtered at 210° F. Before and after filtering the solution has no haze and shows no suspended particles when examined by light for Tyndall-like particle reflection. The filtered solution has a boron to nitrogen weight ratio of 0.263:1.0.

EXAMPLE II

Superboration and Equilibration of Species B

A concentrated form of Species B is first prepared by reducing the SAE-5W oil diluent but otherwise using the same reactants: the urea-(mixed polyamine) condensation product (31 percent nitrogen) and the polybutenyl substituted succinic anhydride of 960 molecular weight. To 6,900 pounds of solution of Species B solution at 210° F. there are added 2,400 pounds boric acid slurried in 850 gallons of SAE-5W oil and 150 gallons of water. The mixture is stirred and heated to 280° F. while injecting nitrogen gas into the liquid. The mixture is held at 280° F. for 1 hour. The product appears to be a uniform solution. The solution is filtered at 250° F. From analysis, the filtrate has 1.39 percent nitrogen and 1.65 percent boron for a boron to nitrogen weight ratio of 1.19. The boron utilization is 89 percent.

Equilibration

The hot filtered solution of superborated Species B is combined with the solution of Species B heated to 290° F. in the amounts of 20,800 pounds of solution of superborated Species B and 48,000 pounds of solution of Species B. The resulting mixture of solutions are stirred at 260° F. for about 1 hour. The resulting product appears as a homogenous solution and by analysis is found to have 1.9 percent nitrogen and 0.5 percent boron for a boron to nitrogen weight ratio of 0.263.

We have discovered for the superboration with boric acid of the difficult to borate oil-soluble nitrogen-containing detergent-dispersant compounds before disclosed and defined as illustrated by Species A and B that the amount of water required for promotion of superboration to achieve 90 to 96 percent boron utilization is less than the water required for promotion of ordinary boric acid boration to B/N weight ratios in the range of 0.1:1.0 to 0.5:1.0. In general the use of water above 0.1 part up to 0.6 part, desirably 0.3 to 0.6 part and preferably 0.4 to 0.6 part, per part of boric acid on a weight basis not only increases boron utilization to the level of 90 to 96 percent but also causes a decrease in the viscosity of the solution of superborated product even though all the water is ultimately removed. Also we have discovered that the boric acid can be added for superboration at temperatures in the range of 180° to 220° F. up to the temperature at which boric acid dehydrates to its ortho acid form and then reacted at much higher temperatures with the nitrogen-containing difficult to borate oil-soluble detergent-dispersant compounds. In fact, the superboration reaction (reaction after all boric acid is added) is advantageously carried out at 300° to 380° F. to prepare superborated products with B/N ratios in the range of 3:1 to 7:1 and upward. For B/N ratios in the 3:1 to 6:1 range the superboration temperature preferably is in the range of 310° to 340° F. but higher temperatures do not appear to be disadvantageous to either end product viscosity or high boron utilization of 90 to 96 percent and higher. For B/N ratios above 6:1 superboration to high boron utilization, 90 to 96 percent and higher, with no adverse effect on end product product viscosity is advantageously conducted at 330° to 360° F. and even as high as 380° F.

The superboration and equilibration steps of this invention can be used on other species of the bis-($C_{50+}$ alkenyl substituted succinimide) of di(aminopolyazalkyl) substituted ureas and their invention products of $C_{50+}$ alkyl substituted phenol, the disubstituted ureas and formaldehyde condensation before described as difficult to borate with boric acid, defined as to types of compounds and exemplified by Species A and B in the manner illustrated by Examples I and II with substantially the same successful attainment of high boron utilization from boric acid.

We claim:

1. A method of preparing an oil soluble boron and nitrogen-containing composition having a boron to nitrogen weight ratio in the range of 0.1 to 0.5 throughout which comprises:

i. adding at a temperature of 180° to 220° F. water and boric acid in a weight ratio of 0.1 to 0.6 part of water per part of boric acid to a hydrocarbon oil solution of a polyamine product produced by mixing in molecular proportion of 2:1, an alkenyl succinic anhydride, wherein the alkenyl substituent has 30 to 20,000 carbon atoms, and a di-alpha, omega-aminopolyazalkylene substituted urea or thiourea having the formula:

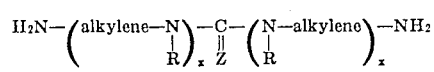

wherein the alkylene group has one to eight carbon atoms, $x$ is an integer from 2 to about 10, Z is oxygen or sulfur and R is hydrogen or an alkyl, group of one to four carbon atoms in a hydrocarbon oil at a temperature of 240° to 300° F and recovering an oil solution of said polyamine product; said boric acid being added to provide 1 to 8 gram moles boric acid per gram atom of nitrogen in said product, ii. heating the resulting mixture of water, boric acid and oil solution product at a temperature in the range of 300° to 380° F. to remove all water, iii. filtering the resulting oil solution of boron-containing product, iv. mixing the filtrate with an additional amount of the oil solution of said polyamine product, said amount being sufficient to provide a final boron to total nitrogen weight ratio in the range of 0.1 to 0.5, and v. equilibrating the resulting mixture to a uniform boron to total nitrogen weight ratio of 0.1 to 0.5 throughout.

2. The method of claim 1 wherein the boric acid is added as a slurry thereof in light mineral oil.

3. The method of claim 2 wherein equilibration is conducted at ambient temperature.

4. The method of claim 2 wherein equilibration is conducted at a temperature in the range of 120° to 250° F.

* * * * *